(12) United States Patent
Fujita

(10) Patent No.: US 10,412,354 B2
(45) Date of Patent: Sep. 10, 2019

(54) PROJECTION TYPE DISPLAY DEVICE AND PROJECTION CONTROL METHOD

(71) Applicant: FUJIFILM Corporation, Tokyo (JP)

(72) Inventor: Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/905,833

(22) Filed: Feb. 27, 2018

(65) Prior Publication Data

US 2018/0192019 A1 Jul. 5, 2018

Related U.S. Application Data

(63) Continuation of application No. PCT/JP2016/057325, filed on Mar. 9, 2016.

(30) Foreign Application Priority Data

Sep. 17, 2015 (JP) ................................. 2015-184047

(51) Int. Cl.
| | | |
|---|---|---|
| *H04N 9/31* | (2006.01) | |
| *B60K 35/00* | (2006.01) | |

(Continued)

(52) U.S. Cl.
CPC .......... *H04N 9/3194* (2013.01); *B60K 35/00* (2013.01); *B60Q 9/00* (2013.01); *G02B 27/01* (2013.01); *G06F 3/147* (2013.01); *G06K 9/00805* (2013.01); *G09G 5/00* (2013.01); *H04N 9/3108* (2013.01); *H04N 9/3147* (2013.01); *B60K 2370/1529* (2019.05); *B60K 2370/177* (2019.05); *B60K 2370/178* (2019.05);

(Continued)

(58) Field of Classification Search
CPC ................................................... H04N 9/3194
See application file for complete search history.

(56) References Cited

U.S. PATENT DOCUMENTS

2016/0193920 A1* 7/2016 Tsubone .................. E02F 9/261
701/36

FOREIGN PATENT DOCUMENTS

| JP | 2005-303493 | 10/2005 | |
|---|---|---|---|
| JP | 2005303493 A * | 10/2005 | ............... G02F 1/13 |

(Continued)

OTHER PUBLICATIONS

"International Search Report (Form PCT/ISA/210) of PCT/JP2016/057325", dated May 31, 2016, with English translation thereof, pp. 1-4.

(Continued)

*Primary Examiner* — Jefferey F Harold
*Assistant Examiner* — Justin B Sanders
(74) *Attorney, Agent, or Firm* — JCIPRNET

(57) ABSTRACT

Provided are a projection type display device and a projection control method capable of accurately performing information presentation to an operator of a vehicle even in an image light shielded state where image light to be projected onto a projection surface is shielded by an object. An HUD 10 that is mounted in a construction machine 100 having a windshield 5 notifies, in a case where it is detected that image light to be projected onto the windshield 5 is in an image light shielded state where at least a part of the image light is shielded by an object, such as part of the body of an operator of a vehicle, the presence of the state.

19 Claims, 13 Drawing Sheets

(51) Int. Cl.
*G02B 27/01* (2006.01)
*G09G 5/00* (2006.01)
*B60Q 9/00* (2006.01)
*G06K 9/00* (2006.01)
*G06F 3/147* (2006.01)
*G03B 21/00* (2006.01)
*G03B 17/54* (2006.01)

(52) U.S. Cl.
CPC .. *B60K 2370/193* (2019.05); *B60K 2370/334* (2019.05); *B60K 2370/736* (2019.05); *G02B 27/0101* (2013.01); *G02B 2027/014* (2013.01); *G02B 2027/0138* (2013.01); *G02B 2027/0141* (2013.01); *G03B 17/54* (2013.01); *G03B 21/005* (2013.01); *G06K 9/00791* (2013.01); *G09G 2380/10* (2013.01)

(56) References Cited

FOREIGN PATENT DOCUMENTS

| | | | | |
|---|---|---|---|---|
| JP | 2010-243940 | 10/2010 | | |
| JP | 2013-067209 | 4/2013 | | |
| JP | 2014-163954 | 9/2014 | | |
| JP | 2014163954 A | * 9/2014 | ............. | G03B 21/14 |
| WO | 2014103498 | 7/2014 | | |

OTHER PUBLICATIONS

"Written Opinion (Form PCT/ISA/237)", dated May 31, 2016, with English translation thereof, pp. 1-9.

"Office Action of Japan Counterpart Application" dated Jan. 30, 2018, with English translation thereof, p. 1-p. 7.

* cited by examiner

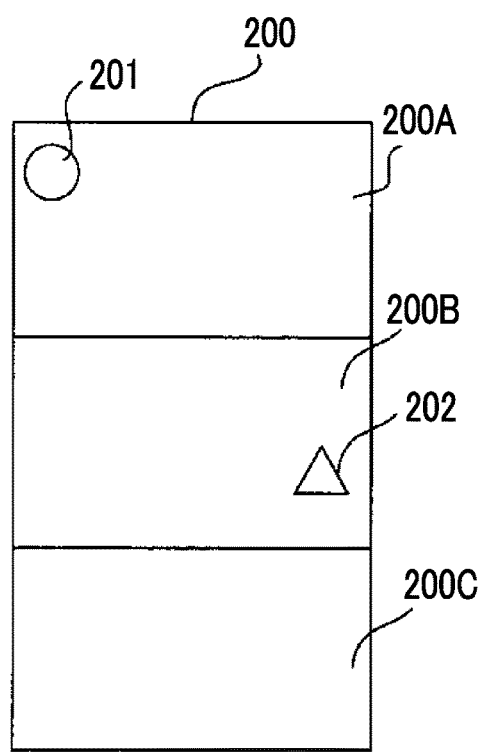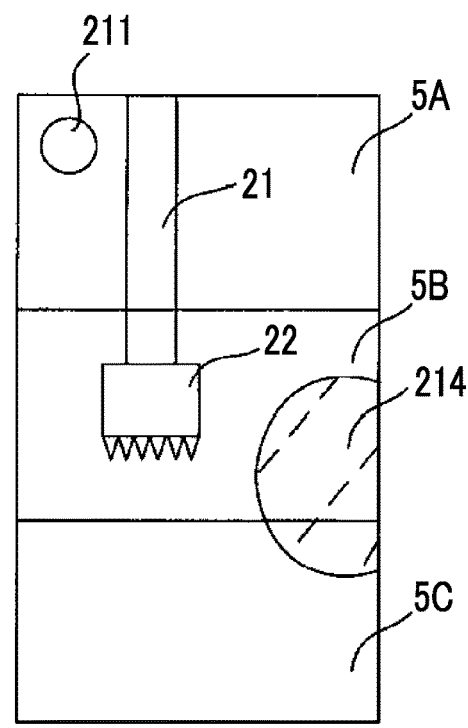

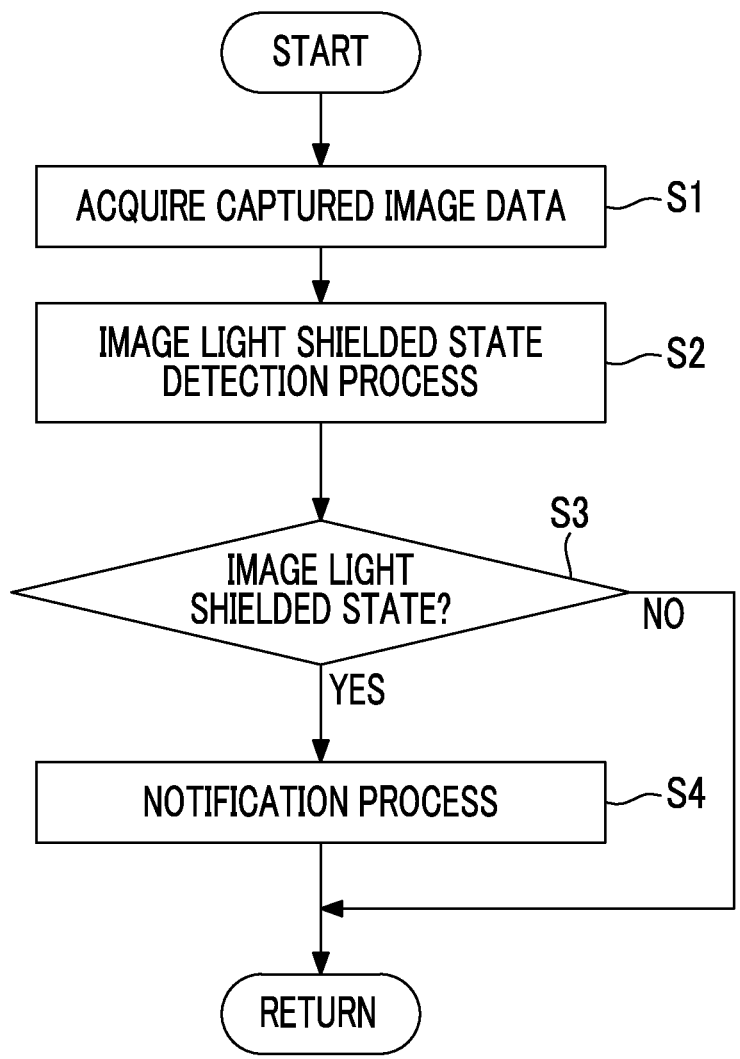

PROJECTION TYPE DISPLAY DEVICE AND PROJECTION CONTROL METHOD

CROSS-REFERENCE TO RELATED APPLICATIONS

This application is a Continuation of PCT International Application No. PCT/JP2016/057325 filed on Mar. 9, 2016, which claims priority under 35 U.S.C § 119(a) to Japanese Patent Application No. 2015-184047 filed on Sep. 17, 2015. Each of the above application(s) is hereby expressly incorporated by reference, in its entirety, into the present application.

BACKGROUND OF THE INVENTION

1. Field of the Invention

The present invention relates to a projection type display device and a projection control method.

2. Description of the Related Art

A vehicle head-up display (HUD) that projects, using a windshield of a vehicle such as an automobile or a combiner disposed in the vicinity of the windshield as a screen, light onto the screen to display an image is known (for example, refer to JP2013-67209A). According to the HUD, a user can set an image based on the light projected from the HUD as a real image on the screen, or can set the image as a virtual image in front of the screen, so that a driver can visually recognize the image.

SUMMARY OF THE INVENTION

In a construction machine, movement of a line of sight of an operator is frequently performed, particularly, in a longitudinal direction, differently from a vehicle of which main purpose is transportation, such as an automobile. Further, a movement range of the line of sight of the operator in the longitudinal direction is wide differently from the vehicle of which main purpose is transportation. In addition, in the construction machine, the line of sight of the operator moves in accordance with movement of a power shovel and/or a bucket that is an operation target. In consideration of these points, in a construction machine with a windshield in front of an operator's seat, it is preferable that a virtual image and a real image are visually recognizable over a wide range of the windshield.

In this way, in a case where image light is projected over a wide range of a windshield, there is a high possibility that a part of the operator's body (for example, hands and/or head, or the like) shields the image light. Information to be presented to the operator using an HUD includes always-existing information that needs to be displayed at all times and not-always-existing information that need to be displayed under a specific condition such as a warning display.

It is assumed that image light projected over a range where the not-always-existing information is displayed is shielded by a part of the operator's body. In this case, since it cannot be said that information is always displayed over the range, it is difficult for the operator to recognize whether the image light is shielded. In this state, in a case where image light for displaying the not-always-existing information is projected, the operator cannot check the not-always-existing information.

Even in a range where the always-existing information is displayed, in a case where visibility of information itself is lowered, for example, in a case where the surroundings are bright, it is difficult for the operator to notice that the always-existing information is shielded by a part of the body.

Here, the construction machine is described as an example, but a state where image light is shielded by a part of the body of a user, or the like may similarly occur in an HUD mounted in either a working machine such as a construction machine or an agricultural machine such as a tractor or a vehicle of which main purpose is transportation. Further, even in such a vehicle, under the environment where a user concentrates on driving, it is difficult for the user to notice a state where image light is shielded by a part of the user's body, or the like.

JP2013-67209A discloses a vehicle in which an HUD is provided in a ceiling portion that is a position where there is a high possibility that image light is shielded by the body of a user. However, this technique does not consider the problem that it is difficult for the user to recognize a state where the image light is shielded.

The invention has been made in consideration of the above-mentioned problems, and an object of the invention is to provide a projection type display device and a projection control method capable of accurately presenting information to an operator of a vehicle even in a case where image light projected onto a projection surface is shielded by an object.

According to an aspect of the invention, there is provided a projection type display device comprising: a projection display unit that projects image light, which is spatially modulated by a light modulation element that spatially modulates light emitted from a light source on the basis of image information, onto a projection surface mounted in a vehicle; a detection unit that is capable of detecting an image light shielded state where at least a part of the image light is shielded by part of a body of an operator of the vehicle; and a control unit that performs a notification process in a case where the image light shielded state is detected by the detection unit.

According to another aspect of the invention, there is provided a projection control method for projecting image light spatially modulated by a light modulation element that spatially modulates light emitted from a light source on the basis of image information onto a projection surface mounted in a vehicle, comprising: a detection step of detecting an image light shielded state where at least a part of the image light is shielded by part of a body of an operator of the vehicle; and a control step of performing a notification process in a case where the image light shielded state is detected in the detection step.

According to the invention, it is possible to provide a projection type display device and a projection control method capable of accurately presenting information to an operator of a vehicle even in a case where image light projected onto a projection surface is shielded by an object.

BRIEF DESCRIPTION OF THE DRAWINGS

FIGS. 8A and 8B are schematic diagrams for illustrating a first notification process.

FIG. 11 is a flowchart for illustrating an operation of the HUD 10 shown in FIG. 1.

DESCRIPTION OF THE PREFERRED EMBODIMENTS

Hereinafter, embodiments of the invention will be described with reference to the accompanying drawings.

Figure 1:
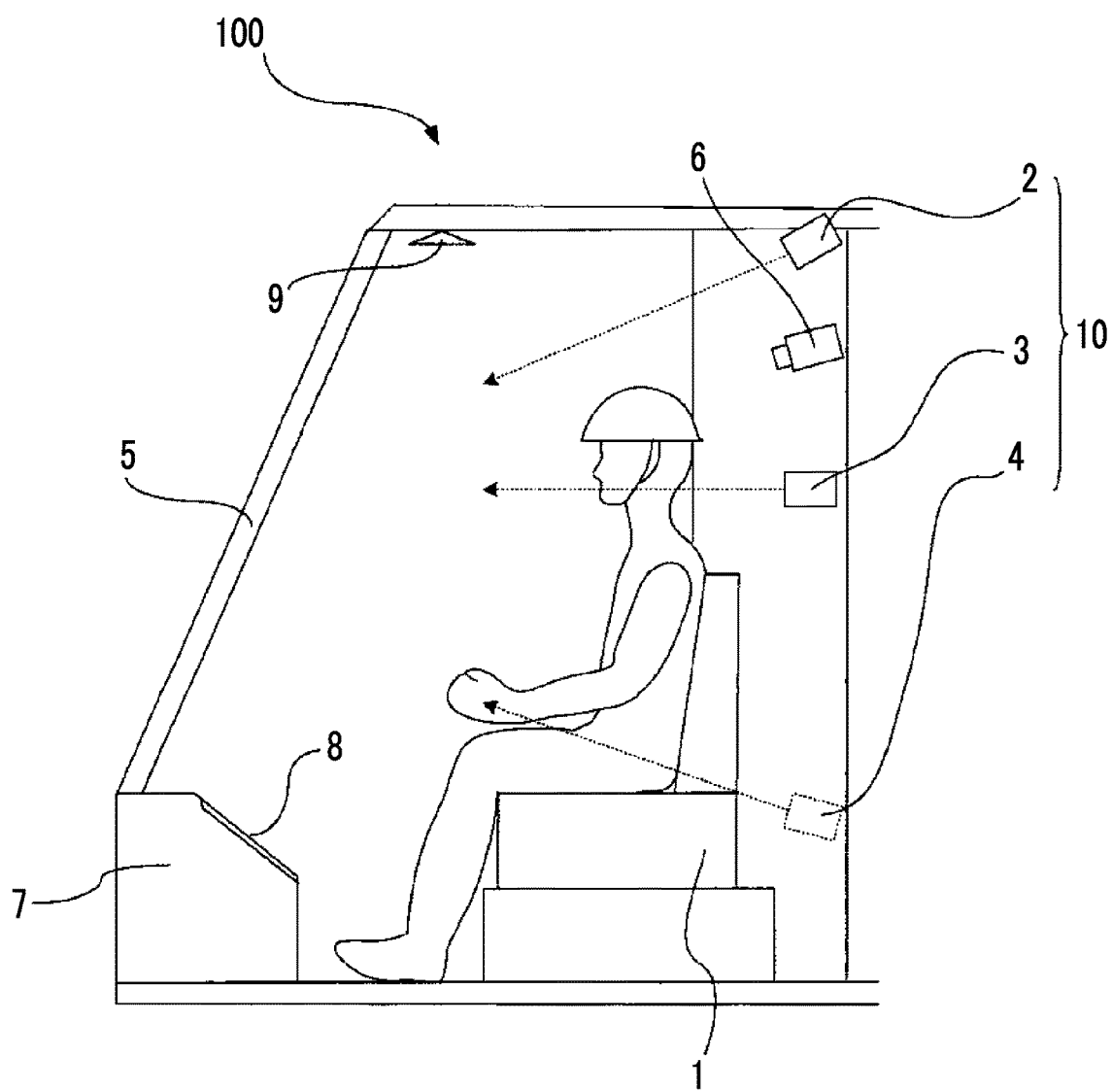
FIG. 1 is a schematic diagram showing a schematic configuration of a construction machine 100 provided with an HUD 10 that is an embodiment of a projection type display device of the invention.

FIG. 1 is a schematic diagram showing a schematic configuration of a construction machine 100 provided with an HUD 10 that is an embodiment of a projection type display device of the invention.

The HUD 10 shown in FIG. 1 is mounted in a working machine such as a construction machine and an agricultural machine, and a vehicle such as an automobile, a train, an airplane, or a ship.

The HUD 10 includes a unit 2 that is provided on an upper and rear side of an operator's seat 1 in an operator's cab, a unit 3 that is provided on a rear side of the operator's seat 1 in the operator's cab, and a unit 4 that is provided on a lower and rear side of the operator's seat 1 in the operator's cab. The operator's seat means an indoor space of the construction machine 100.

The units 2 to 4 are provided to be spaced from each other in a gravity direction (a longitudinal direction in FIG. 1) in the operator's cab of the construction machine 100. Each of the units 2 to 4 projects image light under the condition that a virtual image is visually recognizable in front of a windshield 5 of the construction machine 100.

An operator of the construction machine 100 can visually recognize information on a picture, characters, or the like for assisting an operation of the construction machine 100 by viewing image light that is projected onto the windshield 5 and is reflected therefrom. Further, the windshield 5 has a function of reflecting image light projected from each of the units 2 to 4 and simultaneously transmitting light from the outside (an outside world). Thus, the operator can visually recognize a virtual image based on the image light projected from each of the units 2 to 4 in a state where the virtual image is superimposed on a scene of the outside world.

In the HUD 10, since the units 2 to 4 are provided to be spaced from each other in the gravity direction in the operator's cab of the construction machine 100, it is possible to present a virtual image to the operator over a wide range of the windshield 5.

An imaging unit 6 is provided in the operator's cab above the operator of the construction machine 100. The imaging unit 6 captures a range in the operator's cab that covers the entirety of an optical path of image light projected from each of the units 2 to 4.

The imaging unit 6 employs a stereo camera that uses two imaging elements, for example. The imaging unit 6 is connected to the unit 2 that forms the HUD 10 in a wired or wireless manner, and transmits data on a captured image obtained by imaging the inside of the operator's cab to the unit 2.

On a dashboard 7 of the construction machine 100, a display device 8 that is formed by a liquid crystal display or the like is provided. The display device 8 is connected to the unit 2 that forms the HUD 10 in a wired or wireless manner, and displays information under the control of the unit 2.

A sound output device 9 that is formed by a speaker or the like is provided on a ceiling of the operator's cab of the construction machine 100. The sound output device 9 is connected to the unit 2 that forms the HUD 10 in a wired or wireless manner, and outputs sound under the control of the unit 2.

Figure 2:
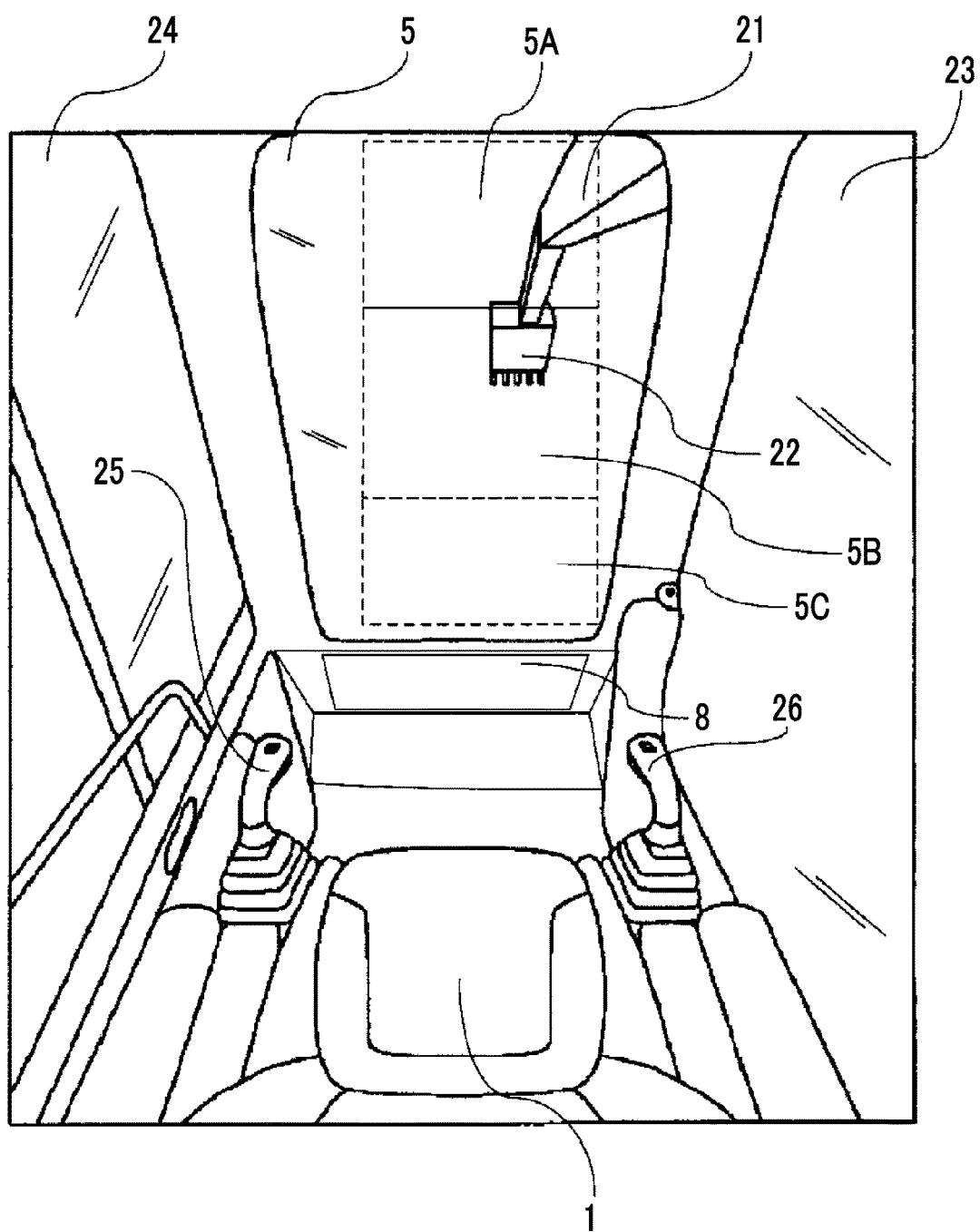
FIG. 2 is a diagram showing an example of a configuration in an operator's cab in the construction machine 100 shown in FIG. 1.

FIG. 2 is a schematic diagram showing an example of a configuration in the operator's cab in the construction machine 100 shown in FIG. 1. FIG. 2 shows a front view in a state where the windshield 5 is seen from the operator's seat 1.

The construction machine 100 is a hydraulic shovel that includes an arm 21 and a bucket 22 in a front center of the machine.

The operator's cab is surrounded by transparent windows such as the windshield 5 that is a front window, a right window 23, a left window 24, and the like.

In the operator's cab, a left operating lever 25 for operating bending and stretching of the arm 21, a right operating lever 26 for operating digging and opening of the bucket 22, and the like are provided around the operator's seat 1.

Three projection ranges of a first projection range 5A, a second projection range 5B, and a third projection range 5C are sequentially allocated onto the windshield 5, and the projection ranges are arranged in the gravity direction (longitudinal direction). Here, a range obtained by combining the three projection ranges on the windshield 5 forms a projection surface mounted in the construction machine 100.

The first projection range 5A is a region where image light projected from the unit 2 is projected, which reflects the image light and simultaneously transmits light from the outside (outside world).

The second projection range 5B is a region where image light projected from the unit 3 is projected, which reflects the image light and simultaneously transmits light from the outside (outside world).

The third projection range 5C is a region where image light projected from the unit 4 is projected, which reflects the image light and simultaneously transmits light from the outside (outside world).

Figure 3:
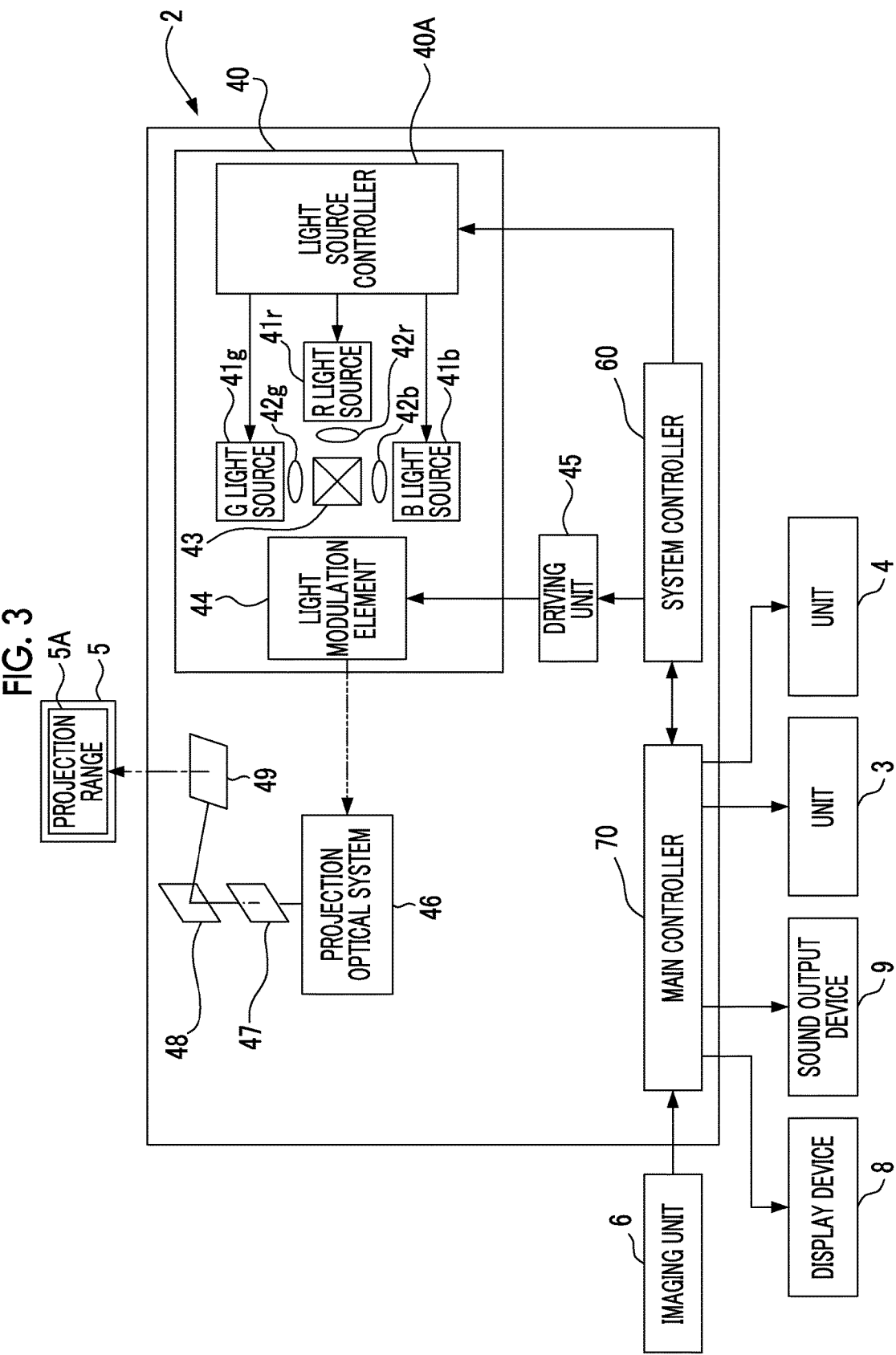
FIG. 3 is a schematic diagram showing an internal configuration of a unit 2 that forms the HUD 10 shown in FIG. 1.

FIG. 3 is a schematic diagram showing an internal configuration of the unit 2 that forms the HUD 10 shown in FIG. 1.

The unit 2 includes a light source unit 40, a driving unit 45, a projection optical system 46, a diffuser plate 47, a reflecting mirror 48, a magnifying glass 49, a system controller 60 that controls a light source controller 40A and the driving unit 45, and a main controller 70.

The light source unit 40 includes the light source controller 40A, an R light source 41r that is a red light source that emits red light, a G light source 41g that is a green light source that emits green light, a B light source 41b that is a blue light source that emits blue light, a dichroic prism 43, a collimator lens 42r that is provided between the R light source 41r and the dichroic prism 43, a collimator lens 42g that is provided between the G light source 41g and the dichroic prism 43, a collimator lens 42b that is provided between the B light source 41b and the dichroic prism 43, and a light modulation element 44.

The dichroic prism 43 is an optical member for guiding light emitted from each of the R light source 41r, the G light source 41g, and the B light source 41b to the same optical path. That is, the dichroic prism 43 transmits red light that is collimated by the collimator lens 42r to be emitted to the light modulation element 44. Further, the dichroic prism 43 reflects green light that is collimated by the collimator lens 42g to be emitted to the light modulation element 44. Further, the dichroic prism 43 reflects blue light that is collimated by the collimator lens 42b to be emitted to the light modulation element 44. An optical member having such a function is not limited to a dichroic prism. For example, a cross dichroic mirror may be used.

The R light source 41r, the G light source 41g, and the B light source 41b respectively employ a light emitting element such as laser or a light emitting diode (LED). In this embodiment, an example in which the HUD includes three light sources of the R light source 41r, the G light source 41g, and the B light source 41b, as the light sources of the light source unit 40, is shown, but the number of light sources may be 1, 2, 4 or more.

The light source controller 40A sets the amounts of luminescence of the R light source 41r, the G light source 41g, and the B light source 41b into predetermined luminescence amount patterns, and performs a control for sequentially emitting light from the R light source 41r, the G light source 41g, and the B light source 41b according to the luminescence amount patterns.

The light modulation element 44 spatially modulates light emitted from the dichroic prism 43 on the basis of projection image data that is image information, and emits light (red color image light, blue color image light, and green color image light) based on the projection image data to the projection optical system 46.

The light modulation element 44 may employ, for example, a liquid crystal on silicon (LCOS), a digital micro-mirror device (DMD), a micro electro mechanical systems (MEMS) element, a liquid crystal display device, or the like.

The driving unit 45 drives the light modulation element 44 according to projection image data input from the system controller 60, so that light (red color image light, blue color image light, and green color image light) based on the projection image data is emitted to the projection optical system 46.

The projection optical system 46 is an optical system for projecting light emitted from the light modulation element 44 of the light source unit 40 onto the diffuser plate 47. The optical system is not limited to a lens, and may employ a scanner. For example, the diffuser plate 47 may diffuse light emitted from a scanning-type scanner to become a plane light source.

The reflecting mirror 48 reflects light diffused by the diffuser plate 47 toward the magnifying glass 49.

The magnifying glass 49 magnifies an image based on light reflected by the reflecting mirror 48, and projects the magnified image onto the first projection range 5A of the windshield 5.

In a case where an image light projection command is received from the main controller 70, the system controller 60 projects image light based on projection image data transmitted from the main controller 70 onto the first projection range 5A.

The main controller 70 generally controls the entirety of the HUD 10, and is able to communicate with each of the units 3 and 4 in a wireless or wired manner. Further, the main controller 70 is also able to communicate with the display device 8 and the sound output device 9 in a wireless or wired manner. Detailed functions of the main controller 70 will be described later.

Figure 4:
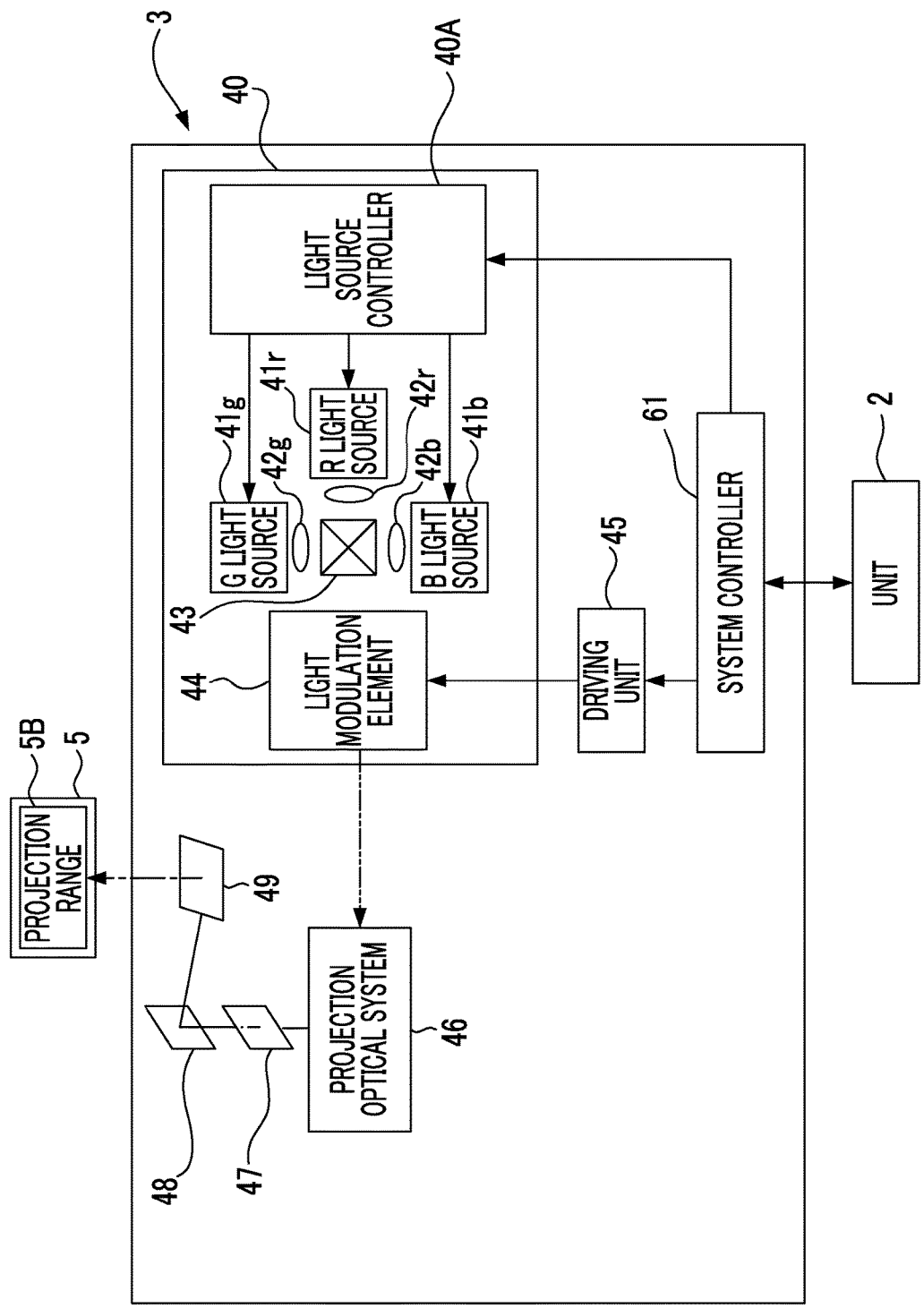
FIG. 4 is a schematic diagram showing an internal configuration of a unit 3 that forms the HUD 10 shown in FIG. 1.

FIG. 4 is a schematic diagram showing an internal configuration of the unit 3 that forms the HUD 10 shown in FIG. 1. In FIG. 4, the same components as in FIG. 3 are given the same reference numerals.

The unit 3 has a configuration in which the main controller 70 is removed in the unit 2 shown in FIG. 3 and the system controller 60 is modified into a system controller 61.

The system controller 61 of the unit 3 controls the driving unit 45 and the light source controller 40A in the unit 3, so that image light based on projection image data transmitted from the main controller 70 is projected onto the second projection range 5B.

The system controller 61 is able to communicate with the main controller 70 of the unit 2. In a case where an image light projection command is received from the main controller 70, the system controller 61 projects image light based on projection image data transmitted from the main controller 70 onto the second projection range 5B.

Figure 5:
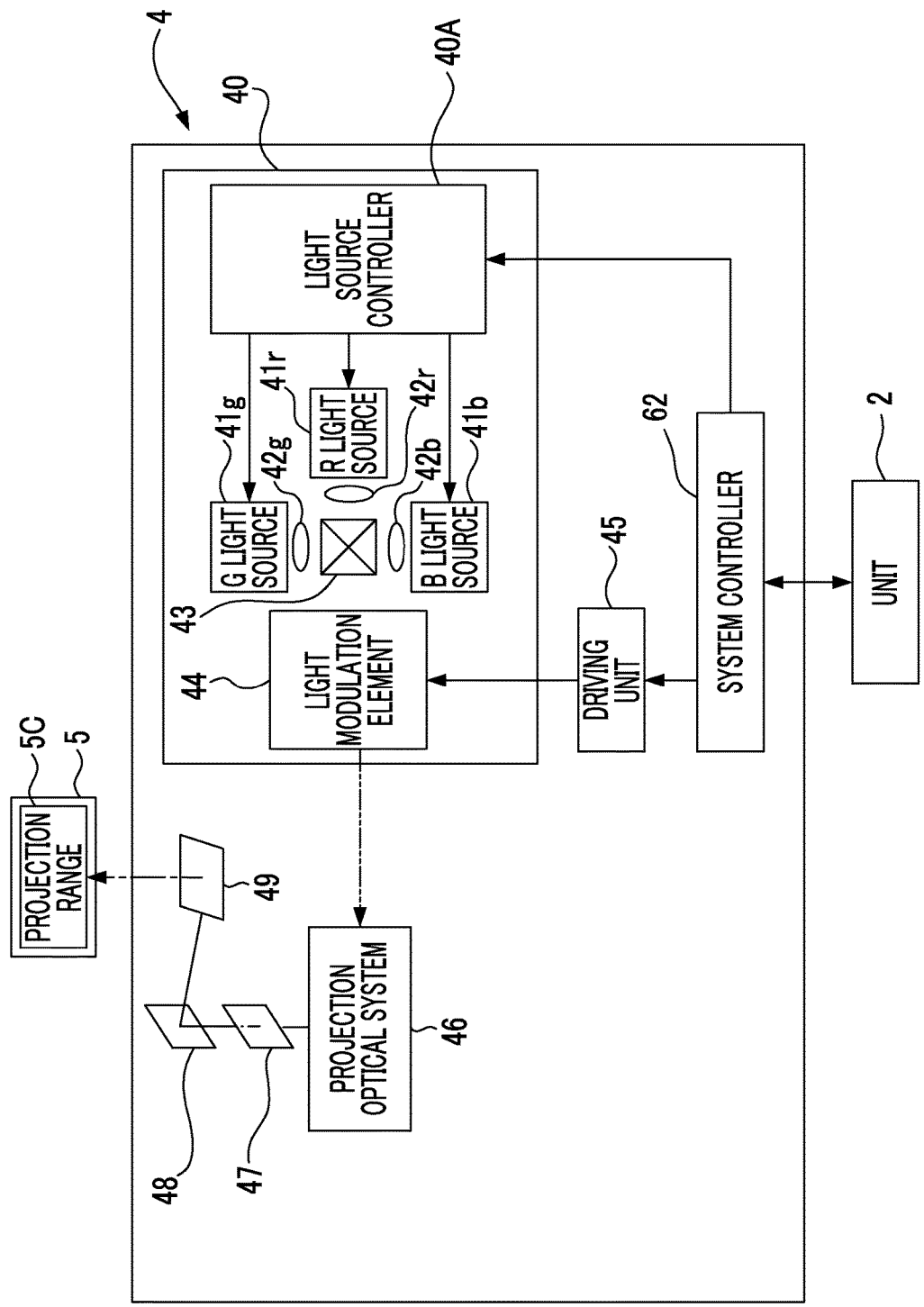
FIG. 5 is a schematic diagram showing an internal configuration of a unit 4 that forms the HUD 10 shown in FIG. 1.

FIG. 5 is a schematic diagram showing an internal configuration of the unit 4 that forms the HUD 10 shown in FIG. 1. In FIG. 5, the same components as in FIG. 3 are given the same reference numerals.

The unit 4 has a configuration in which the main controller 70 in the unit 2 shown in FIG. 3 is removed and the system controller 60 is modified into a system controller 62.

The system controller 62 of the unit 4 controls the driving unit 45 and the light source controller 40A in the unit 4, so that image light based on projection image data transmitted from the main controller 70 is projected onto the third projection range 5C.

The system controller 62 is able to communicate with the main controller 70 of the unit 2. In a case where an image light projection command is received from the main controller 70, the system controller 62 projects image light based on projection image data onto the third projection range 5C.

The light source unit 40, the projection optical system 46, the diffuser plate 47, the reflecting minor 48, and the magnifying glass 49 in the unit 2 form a projection unit that projects image light based on projection image data onto the first projection range 5A.

The light source unit 40, in the unit 3, the projection optical system 46, the diffuser plate 47, the reflecting mirror 48, and the magnifying glass 49 form a projection unit that projects image light based on the projection image data onto the second projection range 5B.

The light source unit 40, the projection optical system 46, the diffuser plate 47, the reflecting mirror 48, and the magnifying glass 49 in the unit 4 form a projection unit that projects image light based on the projection image data onto the third projection range 5C.

The three projection units form a projection display unit of the HUD 10. The projection display unit of the HUD 10 is disposed at a position distant from the windshield 5 that is the projection surface with reference to the operator's seat 1, in the operator's cab of the construction machine 100.

Figure 6:
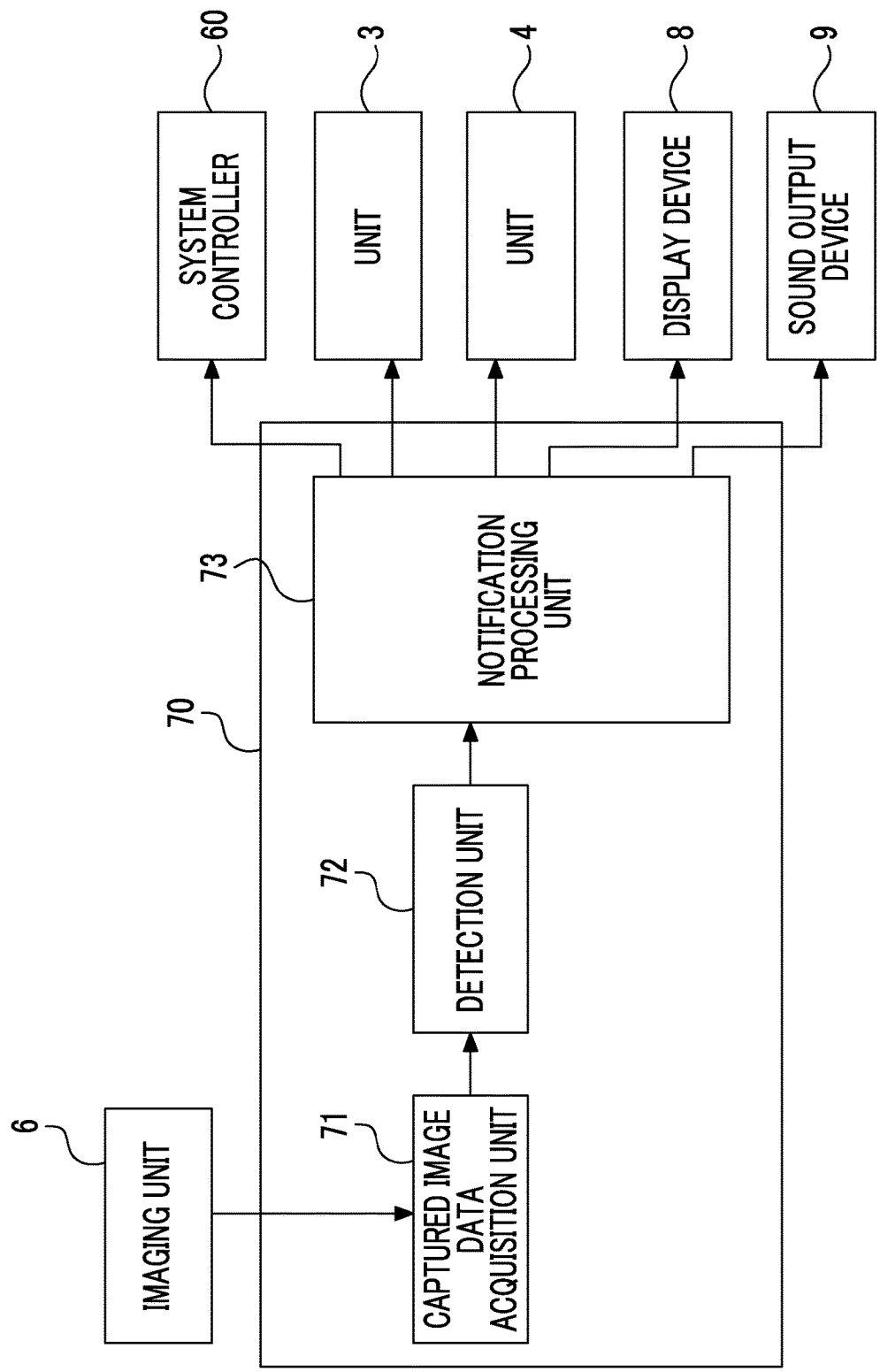
FIG. 6 is a diagram showing a functional block of a main controller 70 that forms the unit 2 shown in FIG. 3.

FIG. 6 is a diagram showing a functional block of the main controller 70 that forms the unit 2 shown in FIG. 3. As shown in FIG. 6, the main controller 70 includes a captured image data acquisition unit 71, a detection unit 72, and a notification processing unit 73.

The captured image data acquisition unit 71 acquires data on a captured image obtained using the imaging unit 6 shown in FIG. 1, and inputs the result to the detection unit 72.

The detection unit 72 detects a state where at least a part of image light projected onto the projection surface (all the ranges including the first projection range 5A, the second projection range 5B, and the third projection range 5C) of the construction machine 100 from the units 2 to 4 is shielded by an object (for example, an operator) (hereinafter, referred to as an image light shielded state).

Figure 7:
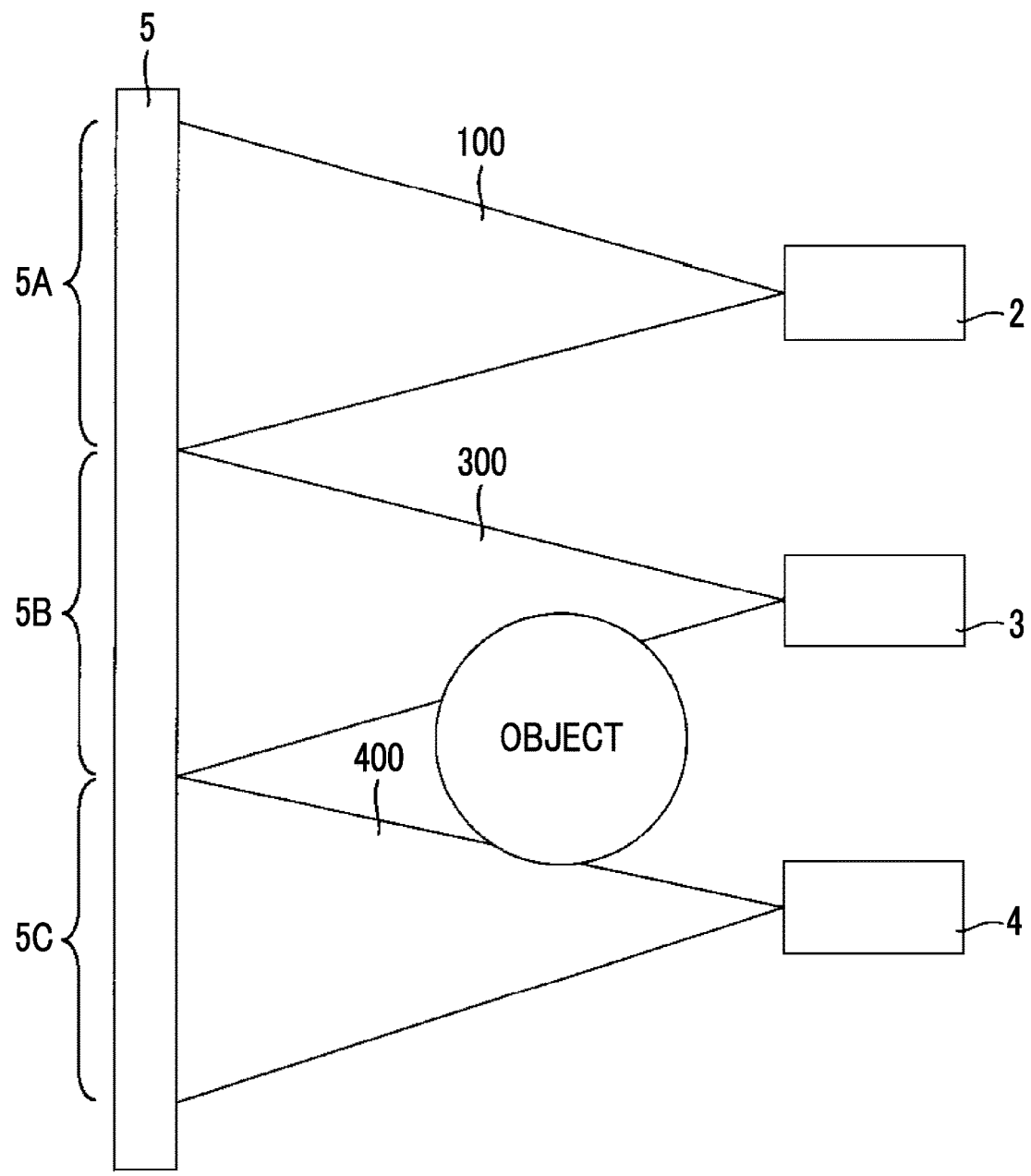
FIG. 7 is a diagram schematically showing an image light shielded state.

FIG. 7 is a diagram schematically showing the image light shielded state.

FIG. 7 shows a range 100 where image light projected from the unit 2 passes, a range 300 where image light projected from the unit 3 passes, and a range 400 where image light projected from the unit 4 passes. In the example of FIG. 7, an object overlaps over a part of the range 300 and a part of the range 400, and this overlapping state corresponds to the image light shielded state.

In order to detect the image light shielded state. the detection unit 72 uses captured image data acquired by the captured image data acquisition unit 71.

From the captured image data, a three-dimensional shape of each of the range 100, the range 300, and the range 400 shown in FIG. 7, in the operator's cab, can be known. Further, in a normal operating state of the HUD 10, it is assumed that an object is not present on each of the range 100, the range 300, and the range 400.

Thus, the detection unit 72 detects the image light shielded state according to whether an object image having a certain size or greater is included in at least one of a portion corresponding to the range 100, a portion corresponding to the range 300, or a portion corresponding to the range 400, in the captured image data.

In a case where the image light shielded state is detected by the above-described method, the detection unit 72 outputs a detection signal to the notification processing unit 73.

The detection signal includes information on a range where an object image is detected in the captured image data (in the example of FIG. 7, the range 300 and the range 400), and information on the position of the object image in the range.

The notification processing unit 73 performs a notification process in a case where the detection signal is input from the detection unit 72. The notification processing unit 73 forms a control unit.

The notification process performed by the notification processing unit 73 employs a first notification process to a fifth notification process to be described hereinafter, for example, but are not limited to these methods.

(First Notification Process)

In a case where a detection signal is input from the detection unit 72, the notification processing unit 73 changes (updates) projection image data into projection image data to which notification information indicating the image light shielded state is added, and projects image light based on the projection image data onto the windshield 5 to notify the presence of the image light shielded state.

The first notification process will be specifically described with reference to FIGS. 8A and 8B and FIGS. 9A and 9B.

FIG. 8A is a diagram showing projection image data 200 that is a source of image light to be projected onto the windshield 5.

Data 200A in the projection image data 200 represents data corresponding to image light projected onto the first projection range 5A from the unit 2. Data 200B represents data corresponding to image light projected onto the second projection range 5B from the unit 3. Data 200C represents data corresponding to image light projected onto the third projection range 5C from the unit 4.

In the example of FIG. 8A, the data 200A includes an icon 201. The data 200B includes an icon 202. The icon 201 and the icon 202 represent information for performing information presentation to an operator, such as information for assisting work (construction design information, warning information, or the like), a traveling speed of the construction machine 100, or fuel information of the construction machine 100.

FIG. 8B is a diagram showing a state where the image light based on the projection image data 200 shown in FIG. 8A is projected onto the windshield 5. As shown in FIGS. 8A and 8B, in front of the projection surface of the windshield 5, a virtual image 211 corresponding to the icon 201 is displayed.

As shown in FIG. 7, FIGS. 8A and 8B show a case where an object is present over a part of the range 300 and a part of the range 400, in which a range 214 (hereinafter, referred to as a missed range) where image light shielded by the object is to be originally projected is shown on the projection surface. The missed range 214 corresponds to a part of the image light based on the projection image data 200, shielded by the object, where the part of the image light shielded by the object is also referred as the "shielded part of the image light". A range other than the missed range 214 on the projection surface corresponds to a part of the image light based on the projection image data 200 other than the part shielded by the object.

The notification processing unit 73 determines the position of the missed range 214 on the projection surface (all the ranges obtained by combining the first projection range 5A, the second projection range 5B, and the third projection range 5C) shown in FIG. 8B, on the basis of information on the range where the object is present, included in the detection signal input from the detection unit 72 and information on the position of the object in the range. The position of the missed range 214 means coordinates data in the periphery of the missed range 214.

Further, the notification processing unit 73 generates projection image data 200a obtained by changing data corresponding to a range other than the missed range 214 on the projection surface into data including notification information (for example, an icon, characters, or the like) for notification of the image light shielded state, in the projection image data 200, and transmits data 200A, data 200B, and data 200C of the projection image data 200a to the system controllers 60 to 62.

Figure 9A:
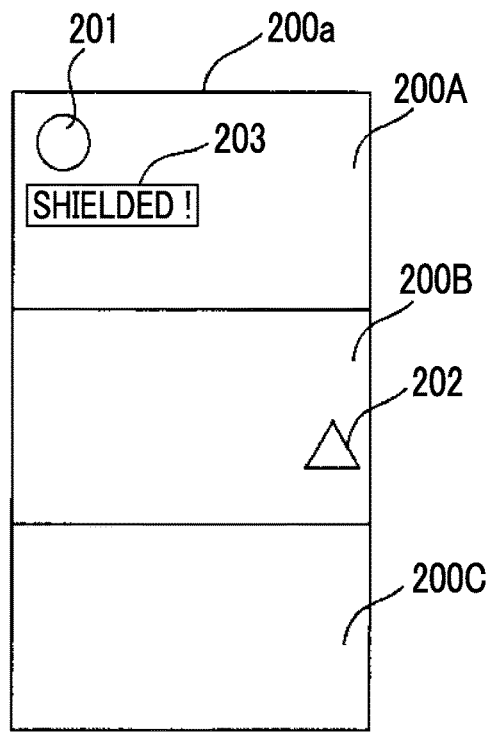
FIGS. 9A and 9B are schematic diagrams for illustrating a first notification process.

FIG. 9A is a diagram showing the projection image data 200a. The projection image data 200a is obtained by adding character information 203 that is notification information below the icon 201 with respect to the projection image data 200.

The system controller 60 controls the driving unit 45 and the light source controller 40A in the unit 2, so that image light based on the data 200A of the projection image data 200a is projected onto the first projection range 5A of the windshield 5. Further, the system controller 61 in the unit 3 controls the driving unit 45 and the light source controller 40A in the unit 3, so that image light based on the data 200B of the projection image data 200a is projected onto the second projection range 5B of the windshield 5. Further, the system controller 62 in the unit 4 controls the driving unit 45 and the light source controller 40A in the unit 4, so that image light based on the data 200C of the projection image data 200a is projected onto the third projection range 5C of the windshield 5.

Figure 9B:
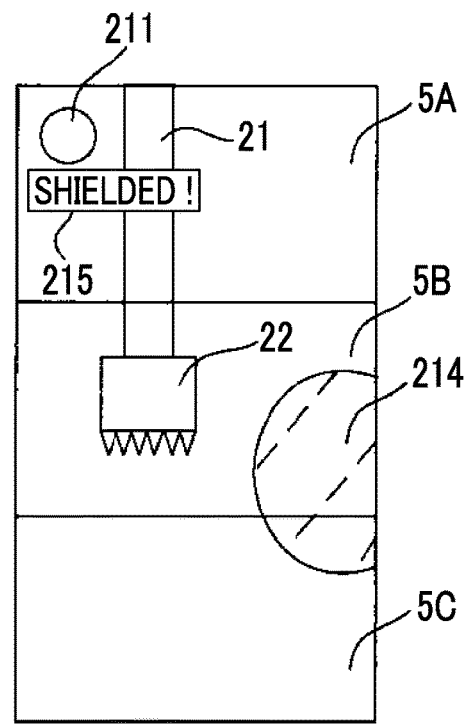

FIG. 9B is a diagram showing a state where the image light based on the projection image data 200a shown in FIG. 9A is projected onto the windshield 5. FIG. 9B shows a virtual image 215 corresponding to the character information 203 included in the projection image data 200a. The missed range 214 shown in FIGS. 8B and 9B corresponds to an image, and is not actually seen to an operator.

The operator views the virtual image 215 shown in FIG. 9B to thereby recognize the image light shielded state.

Even in a state where image light is shielded by a part of the body of the operator through the first notification process, the operator can easily recognize the presence of the state. Thus, the operator can move the operator's body to take an action for prohibiting the image light shielded state, and thus, it is possible to accurately provide necessary information to the operator.

(Second Notification Process)

The notification processing unit 73 notifies the image light shielded state using sound.

Specifically, the notification processing unit 73 outputs sound indicating, for example, "there is a possibility that a part of display information is shielded by an object", or the like through the sound output device 9. The notification processing unit 73 may notify the presence of the image light shielded state using a buzzer sound or a melody sound, instead of using the sound message.

Even in a case where image light is shielded by a part of the operator's body, through the second notification process, the operator can easily recognize the state using sound.

By combining the first notification process and the second notification process, it is possible to cause the operator to accurately recognize the image light shielded state.

(Third Notification Process)

In a case where a detection signal is input from the detection unit 72, the notification processing unit 73 extracts, from data corresponding to a part of image light, shielded by an object, in projection image data, shielding information (important information that may cause obstacles in working and driving, which does not include information that does not interference with work, such as time information) to be presented to an operator of the construction machine 100, included in the data, and performs of notification of the shielding information.

The third notification process will be described with reference to FIGS. 8A and 8B and FIGS. 10A and 10B.

The notification processing unit 73 determines the position of the missed range 214 on the projection surface (all the ranges obtained by combining the first projection range 5A, the second projection range 5B, and the third projection range 5C) shown in FIG. 8B, on the basis of information on a range where an object is present, included in the detection signal input from the detection unit 72, and information on the position of the object in the range.

Further, the notification processing unit 73 determines whether shielding information to be presented to the operator, such as information for assisting work, a traveling speed of the construction machine 100, or fuel information of the construction machine 100, is included in the data of the part corresponding to the missed range 214 in the projection image data 200.

In a case where it is determined that the shielding information to be presented to the operator is included in the data of the part corresponding to the missed range 214 in the projection image data 200, the notification processing unit 73 generates projection image data 200b obtained by adding the shielding information included in the data of the part corresponding to the missed range 214 to data corresponding to a part excluding the missed range 214 in the projection image data 200, and transmits data 200A, data 200B, and data 200C of the projection image data 200b to the system controllers 60 to 62.

Figure 10A:
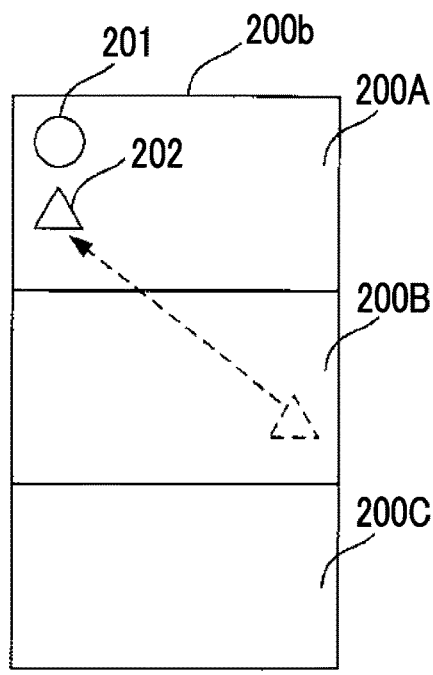
FIGS. 10A and 10B are schematic diagrams for illustrating a third notification process.
Figure 10B:
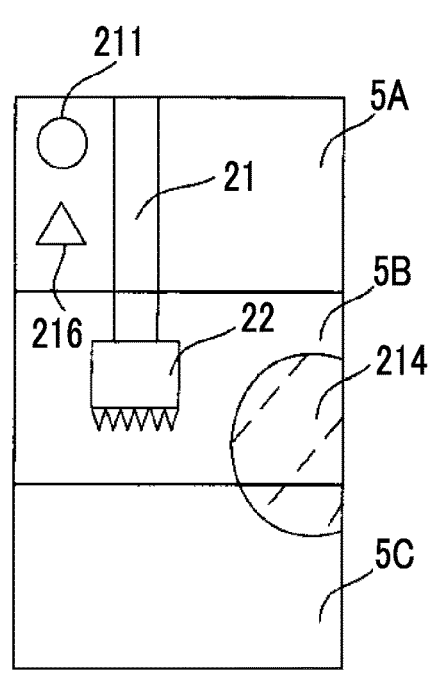

FIG. 10A is a diagram showing the projection image data 200b. FIG. 10B is a diagram showing a state where image light based on the projection image data 200b shown in FIG. 10A is projected onto the windshield 5.

As shown in FIG. 10A, the icon 202 disposed at a position indicated by a broken line in the projection image data 200 is moved to below the icon 201 in the projection image data 200b. This is because the icon 202 is included in the data corresponding to the missed range 214 in the projection image data 200.

In this way, the notification processing unit 73 generates the projection image data 200b obtained by removing the icon 201 that is shielding information in the projection image data 200, and by adding the icon 202 to a part other than the data corresponding to the missed range 214 in the projection image data 200.

In a case where the projection image data 200b is generated, the system controller 60 controls the driving unit 45 and the light source controller 40A in the unit 2, so that image light based on the data 200A of the projection image data 200b is projected onto the first projection range 5A of the windshield 5. Further, the system controller 61 in the unit 3 controls the driving unit 45 and the light source controller 40A in the unit 3, so that image light based on the data 200B of the projection image data 200b is projected onto the second projection range 5B of the windshield 5. Further, the system controller 62 in the unit 4 controls the driving unit 45 and the light source controller 40A in the unit 4, so that image light based on the data 200C of the projection image data 200b is projected onto the third projection range 5C of the windshield 5.

Thus, the state of FIG. 8B transitions to the state of FIG. 10B. FIG. 10B shows a virtual image 216 corresponding to the icon 202 included in the projection image data 200b. The missed range 214 shown in FIG. 10B corresponds to an image, and is not actually seen to an operator.

According to the third notification process, even in a case where information (icon 202 in FIG. 10A) to be presented to the operator is shielded by a part of the operator's body, or the like, since the virtual image 216 corresponding to the icon 202 is moved to a position where the virtual image 216 is visually recognized, the operator can easily recognize the shielding information. Accordingly, it is possible to accurately perform working assistance.

Fourth Notification Process

The notification processing unit 73 notifies the shielding information described in the third notification process using sound.

Specifically, in a case where it is determined that there is shielding information, the notification processing unit 73 outputs a message, boozer sound, melody sound, or the like corresponding to the shielding information, from the sound output device 9.

For example, in a case where the shielding information is an icon for warning fuel shortage, the notification processing unit 73 outputs a message "Fuel is running low. Please refill." through the sound output device 9.

According to the fourth notification process, even in a case where information to be presented to an operator is shielded by a part of the operator, or the like, it is possible to notify shielding information using sound, and thus, the operator can easily recognize the shielding information. Thus, it is possible to accurately perform working assistance.

By combining the third notification process and the fourth notification process, it is possible to cause the operator to more accurately recognize the shielding information.

Fifth Notification Process

The notification processing unit 73 performs notification by displaying the shielding information described in the third notification process on the display device 8.

Specifically, in a case where it is determined that there is shielding information, the notification processing unit 73 displays a message corresponding to the shielding information (for example, "Fuel is running low. Please refill.") on the display device 8. According to this configuration, even in an environment where sound is difficult to hear, it is possible to easily recognize the shielding information.

FIG. 11 is a flowchart for illustrating an operation of the HUD 10 shown in FIG. 1.

In a case where the HUD 10 is started, the main controller 70 controls the system controller 60, the system controller 61, and the system controller 62 to project image light based on projection image data onto the windshield 5.

In a case where the HUD 10 is started, the imaging unit 6 starts imaging, and transmits data on a captured image obtained through the imaging to the main controller 70 of the unit 2. The captured image data acquisition unit 71 acquires the captured image data obtained using the imaging unit 6 (step S1).

The detection unit 72 performs a process of detecting whether an image light shielded state is present on the basis of the captured image data acquired using the captured image data acquisition unit 71 and information (stored in an internal memory in advance) on a range indicating an optical path of image light of each of the units 2 to 4 (step S2).

In a case where it is determined that the image light shielded state is present (YES in step S3), the detection unit 72 inputs a detection signal to the notification processing unit 73.

The notification processing unit 73 performs a notification process using any one of the above-described methods on the basis of the detection signal that is input in this way (step S4). After the process of step S4, the procedure returns to step S1, and the above-described processes are repeated.

In a case where it is determined that the image light shielded state is not present in step S3 (NO in step S3), the notification process is not performed, and the procedure returns to step S1.

Accordingly, according to the HUD 10 shown in FIG. 1, even in a case where it is detected that the image light shielded state is present, it is possible to display notification information indicating the presence of the image light shielded state using a virtual image, to notify the presence of the image light shielded state using sound, to display an icon shielded by an object using a virtual image, or to notify a message corresponding to the icon shielded by the object using sound and/or display.

Thus, under the environment where an operator concentrates on an operation, even in a state where image light is shielded by a part of the operator's body, or the like, the operator can easily recognize the state, or can check shielding information. Accordingly, the operator can receive accurate working assistance, and can perform the operation smoothly.

A working machine such as a construction machine or an agricultural machine has a narrow indoor space. In a case where projection over a wide range is performed in such a narrow indoor space, shielding of image light due to a part of the operator's body, or the like easily occurs. For this reason, the invention is particularly advantageous in a case where the HUD 10 is applied to the working machine such as a construction machine or an agricultural machine.

In the above description, a plurality of projection ranges set on the windshield 5 is arranged in the gravity direction (longitudinal direction), but the plurality of projection ranges set on the windshield 5 may be arranged in a horizontal direction (lateral direction). In this case, in the operator's cab of the construction machine 100, a configuration in which units that project image light to the respective projection ranges are spaced from each other in the horizontal direction may be used.

Further, in the above description, the plurality of projection ranges set on the windshield 5 are arranged in one direction, but the plurality of projection ranges may be arranged in a two-dimensional shape.

Further, in the HUD 10 shown in FIG. 1, a configuration in which the unit 3 and the unit 4 are removed may be used. That is, at least one projection unit may be used. In this configuration, since there is a possibility that the image light is shielded, the configuration of the main controller 70 becomes effective.

In the above description, the main controller 70 is provided in the unit 2, but a configuration in which a control unit that includes the main controller 70 is provided as a separate body and the control unit generally controls the system controllers of the units 2 to 4 may be used.

Further, in the above description, all of the units 2 to 4 are configured to project image light under the condition that a virtual image is visually recognizable, but at least one of the units 2 to 4 may be configured to project image light under the condition that a real image is visually recognizable.

Figure 12:
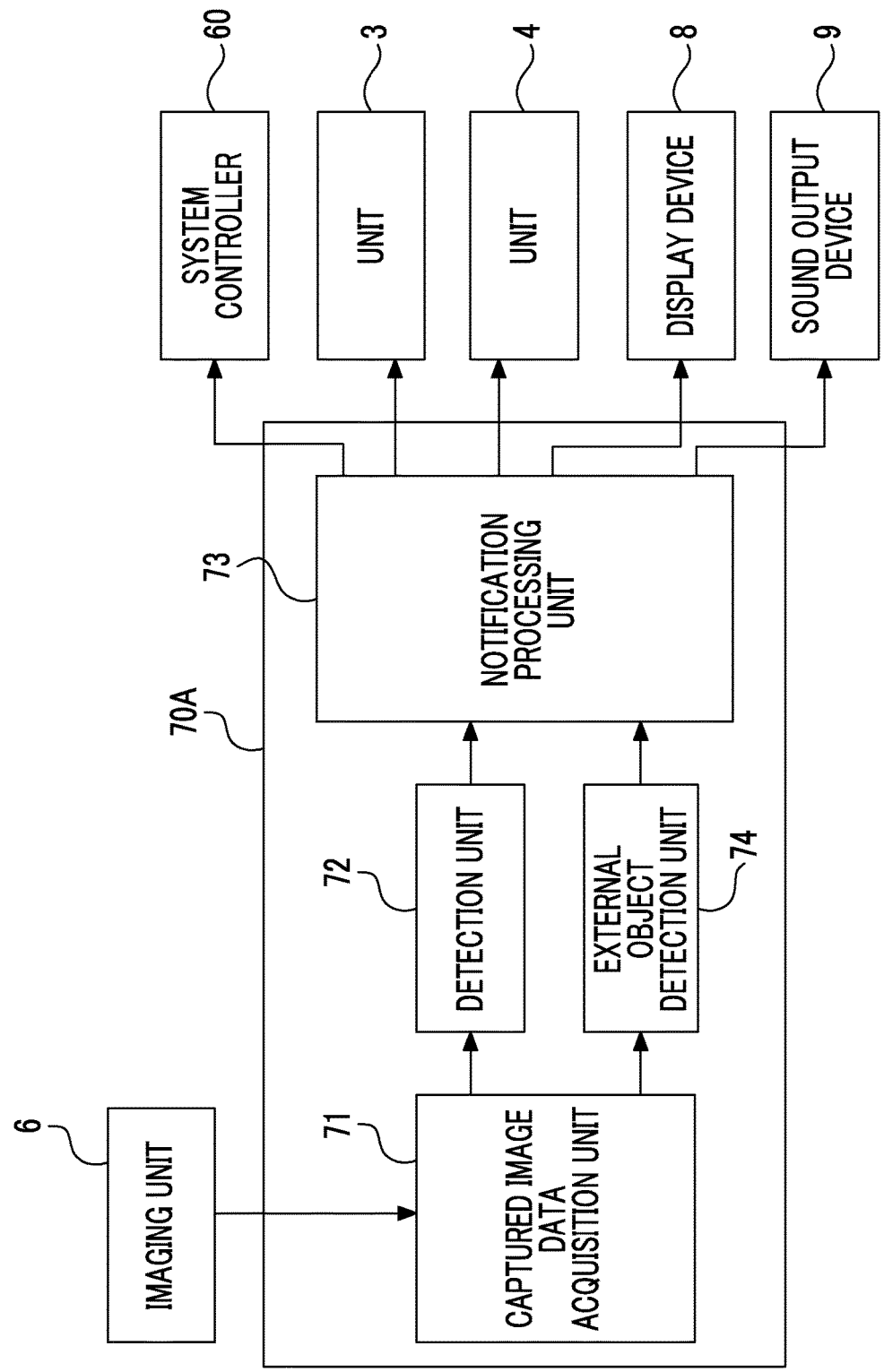
FIG. 12 is a diagram showing a functional block of a main controller 70A that is a modification example of the main controller 70 shown in FIG. 3.

FIG. 12 is a functional block diagram of a main controller 70A that is a modification example of the main controller 70 of the unit 2 shown in FIG. 3. In FIG. 12, the same components as in FIG. 6 are given the same reference numerals.

As shown in FIG. 12, the main controller 70A includes an external object detection unit 74, in addition to the configuration of the main controller 70.

In the external object detection unit 74, image feature information on an external object (in this embodiment, a bucket 22) present in a front center of the construction machine 100 is set in advance.

The external object detection unit 74 performs matching based on the image feature information with respect to a portion corresponding to the projection surface in the captured image data acquired by the captured image data acquisition unit 71, to thereby detect whether the external object is present in front of the projection surface. In a case where it is detected that the external object is present, the external object detection unit 74 outputs information on the position of the external object on the projection surface to the notification processing unit 73.

The notification processing unit 73 determines whether to perform the above-described notification process on the basis of the information on the position of the object included in a detection signal input from the detection unit 72 (information on the position of the object in each of the ranges 100, 300, and 400 shown in FIG. 7) and the information on the position of the external object input from the external object detection unit 74.

Hereinafter, description will be specifically made with reference to FIGS. 13A and 13B.

Figure 13A:
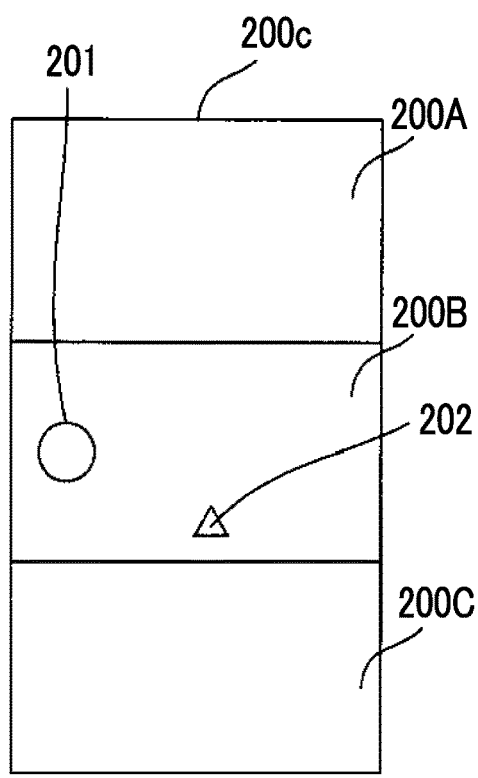
FIGS. 13A and 13B are schematic diagrams for illustrating functions of the main controller 70A.

FIG. 13A is a diagram showing projection image data 200c generated by the main controller 70A. FIG. 13B is a diagram showing a state where image light based on the projection image data 200c shown in FIG. 13A is projected onto the windshield 5. FIG. 13B shows a missed range 214 in a similar way to FIG. 8B.

Figure 13B:
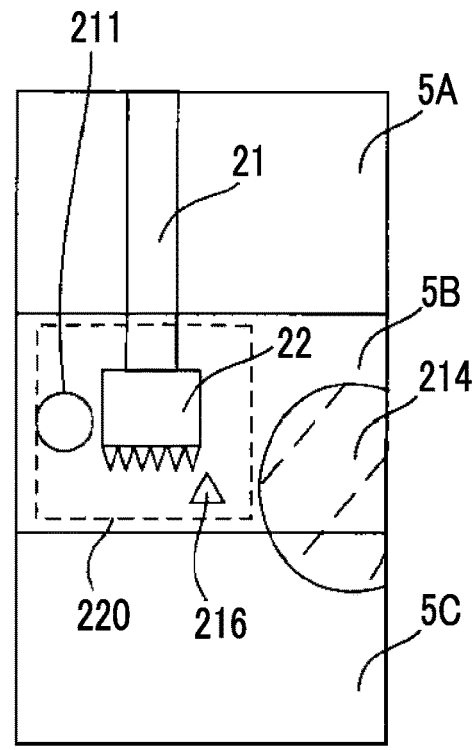

In the state shown in FIG. 13B, the external object detection unit 74 of the main controller 70A detects, on the basis of data corresponding to the projection surface in captured image data acquired using the imaging unit 6, the bucket 22 that is an external object from the data. The external object detection unit 74 outputs information on the position of the bucket 22 to the notification processing unit 73 as a detection result. The information on the position of the bucket 22 is information on the position of a region 220 having a predetermined size that surrounds the bucket 22.

The notification processing unit 73 compares the information on the position of the missed range 214 on the projection surface input from the detection unit 72 with the information on the position of the bucket 22 on the projection surface input from the external object detection unit 74.

In a case where it is determined that the region 220 is outside the missed range 214 through the comparison, the notification processing unit 73 does not perform the above-described notification process in a case where it is determined that the region 220 is outside the missed range 214, and performs the above-described notification process in a case where it is determined that the region 220 is inside the missed range 214.

In the construction machine 100, basically, an operator performs an operation while viewing the vicinity of the bucket 22. Accordingly, concentration on the vicinity of the bucket 22 with respect to information to be presented to the operator causes a small movement of a sight line, which is preferable.

Thus, the main controller 70A generates the projection image data 200c so that virtual images 211 and 216 are displayed in the region 220 including the bucket 22. In this way, in a case where it is assumed that a virtual image is displayed in the region 220, when image light projected onto the region 220 is not shielded, there is no particular influence on working assistance.

Accordingly, the notification processing detection unit 73 does not perform the notification process in a case where it is determined that the region 220 is outside the missed range 214.

Figure 14:
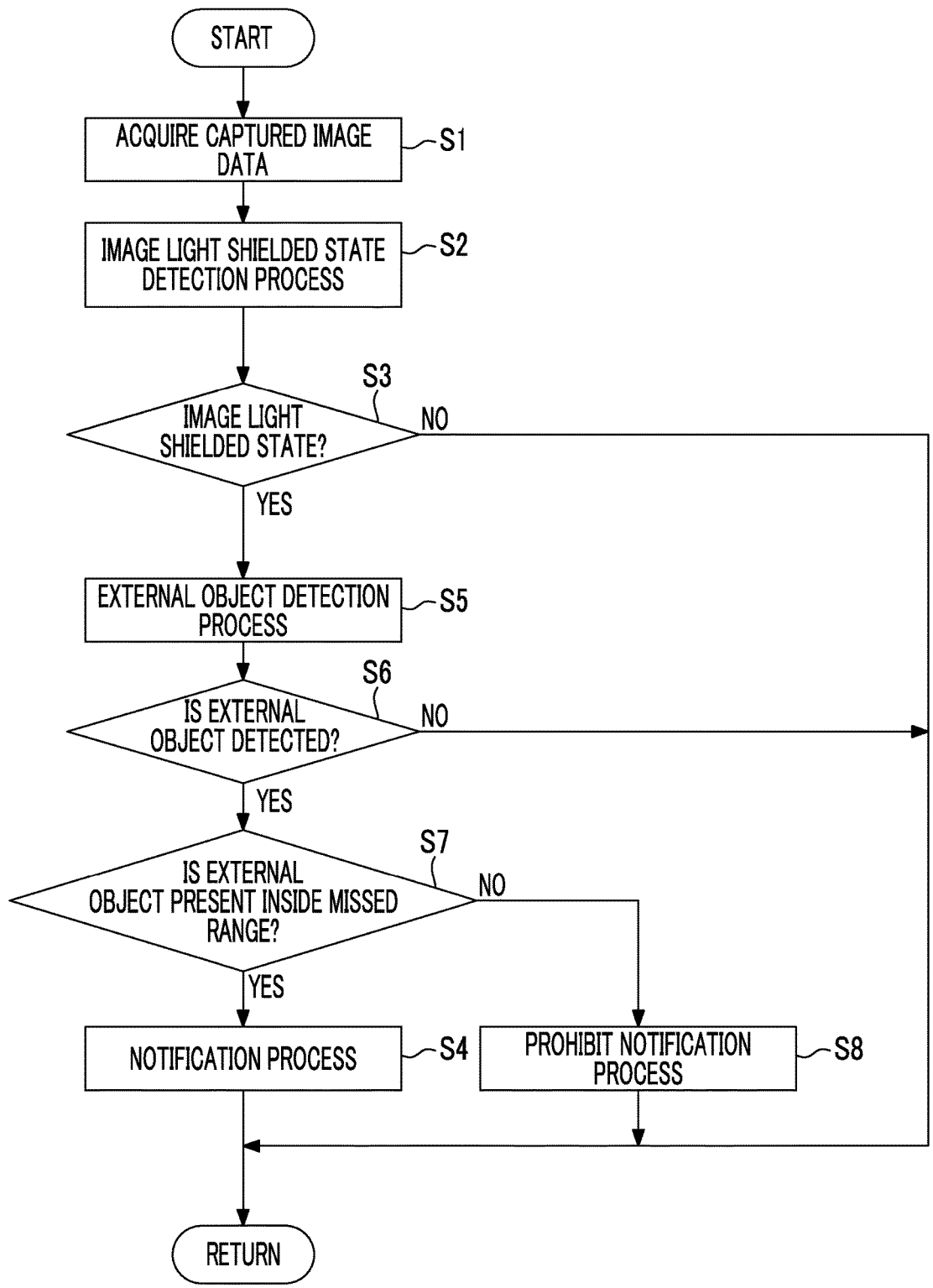
FIG. 14 is a flowchart for illustrating an operation of an HUD 10 having the main controller 70A shown in FIG. 12.

FIG. 14 is a flowchart for illustrating an operation of the HUD 10 having the main controller 70A shown in FIG. 12. The flowchart shown in FIG. 14 is the same as the flowchart shown in FIG. 11 except that steps S5 to S8 are added. In FIG. 14, the same processes as in FIG. 11 are given the same reference numerals, and description thereof will not be repeated.

In FIG. 14, in a case where the determination in step S3 is YES, the external object detection unit 74 detects an external object in front of the projection surface (step S5).

The external object detection unit 74 determines whether the external object is detected (step S6). In a case where it is determined that the external object is detected (YES in step S6), the external object detection unit 74 inputs information on the position of the external object to the notification processing unit 73. In a case where it is determined that the external object is not detected (NO in step S6), the procedure returns to step S1.

The notification processing unit 73 determines whether the external object detected by the external object detection unit 74 is inside the missed range on the projection surface input from the detection unit 72 (step S7).

In the example of FIGS. 13A and 13B, in a case where there is an overlapping portion between the missed range 214 and the region 220 including the external object, the notification processing unit 73 determines that the external object is inside the missed range, and in a case where there is no overlapping portion between the missed range 214 and the region 220, the notification processing unit 73 determines that the external object is outside the missed range.

In a case where the determination of step S7 is YES, the notification processing unit 73 performs the notification process (step S4). After the process of step S4, the procedure returns to step S1, and the above-described processes are repeated.

In a case where the determination of step S7 is NO, the notification processing unit 73 prohibits the notification process (step S8). After the process of step S8, the procedure returns to step S1, and the above-described processes are repeated.

As described above, in the HUD 10 of the modification example, in a case where the region 220 including the external object and the missed range 214 overlap each other, the notification process is performed, and in a case where the region 220 including the external object and the missed range 214 do not overlap each other, the notification process is not performed. Thus, it is possible to prevent the notification process from being excessively performed, and to efficiently perform an operation.

The position of the bucket 22 is uniquely determined by operation signals of the left operating lever 25 and the right operating lever 26. Thus, the external object detection unit 74 may detect the position of the external object on the basis of the operation signals.

As described above, the following configurations are disclosed in this specification.

A disclosed projection type display device includes: a projection display unit that projects image light spatially modulated by a light modulation element that spatially modulates light emitted from a light source on the basis of image information onto a projection surface mounted in a vehicle; a detection unit that is capable of detecting an image light shielded state where at least a part of the image light is shielded by part of a body of an operator of the vehicle; and a control unit that performs a notification process in a case where the image light shielded state is detected by the detection unit.

The disclosed projection type display device is configured so that the notification process performed by the control unit is a process of notifying the presence of the image light shielded state.

The disclosed projection type display device is configured so that the control unit notifies the presence of the image light shielded state by changing information corresponding to a part of the image light excluding the shielded part of the image light to information including notification information indicating the presence of the image light shielded state, in the image information.

The disclosed projection type display device is configured so that the control unit performs the notification using sound.

The disclosed projection type display device is configured so that the notification process performed by the control unit is a process of notifying shielding information, to be presented to the operator of the vehicle, included in information corresponding to the shielded part of the image light in the image information.

The disclosed projection type display device is configured so that the control unit notifies the shielding information by including the shielding information in information corresponding to a part of the image light excluding the shielded part of the image light in the image information.

The disclosed projection type display device is configured so that the control unit notifies the shielding information using sound.

The disclosed projection type display device is configured so that the control unit notifies the shielding information by displaying the shielding information on a display device mounted in the vehicle.

The disclosed projection type display device is configured so that the projection surface is a windshield of the vehicle, the projection type display device further comprises an external object detection unit that detects the position of an external object in front of the projection surface, and the control unit determines whether to perform the notification process on the basis of a range of the projection surface where the shielded part of the image light is to be projected and the position of the external object on the projection surface detected by the external object detection unit.

The disclosed projection type display device is configured so that the control unit prohibits the notification process in a case where the position of the external object detected by the external object detection unit is outside the range of the projection surface where the shielded part of the image light is to be projected.

The disclosed projection type display device is configured so that the vehicle is a working machine.

The disclosed projection type display device is configured so that the projection display unit is disposed at a position distant from the projection surface with reference to an operator's seat in an indoor space of the vehicle.

A disclosed projection control method projects image light spatially modulated by a light modulation element that spatially modulates light emitted from a light source on the basis of image information onto a projection surface mounted in a vehicle, and includes: a detection step of detecting an image light shielded state where at least a part of the image light is shielded by part of a body of an operator of the vehicle; and a control step of performing a notification process in a case where the image light shielded state is detected in the detection step.

The disclosed projection control method is configured so that the notification process is a process of notifying the presence of the image light shielded state.

The disclosed projection control method is configured so that the control step includes notifying the presence of the image light shielded state by changing information corresponding to a part of the image light excluding the shielded part of the image light to information including notification information indicating the presence of the image light shielded state, in the image information.

The disclosed projection control method is configured so that the control step includes performing the notification using sound.

The disclosed projection control method is configured so that the notification process is a process of notifying shielding information, for performing information presentation to the operator of the vehicle, included in information corresponding to the shielded part of the image light in the image information.

The disclosed projection control method is configured so that the control step includes notifying the shielding information by including the shielding information in information corresponding to a part of the image light excluding the shielded part of the image light in the image information.

The disclosed projection control method is configured so that the control step includes notifying the shielding information using sound.

The disclosed projection control method is configured so that the control step includes notifying the shielding information by displaying the shielding information on a display device mounted in the vehicle.

The disclosed projection control method is configured so that the projection surface is a windshield of the vehicle, the projection control method further comprises an external object detection step of detecting the position of an external object in front of the projection surface, and the control step includes determining whether to perform the notification process on the basis of a range of the projection surface where the shielded part of the image light is to be projected and the position of the external object on the projection surface detected in the external object detection step.

The disclosed projection control method is configured so that the control step includes prohibiting the notification process in a case where the position of the external object detected in the external object detection step is outside the range of the projection surface where the shielded part of the image light is to be projected.

The disclosed projection control method is configured so that the vehicle is a working machine.

The invention is applied to a working machine such as a construction machine or an agricultural machine, which provides high comfort and effectiveness.

EXPLANATION OF REFERENCES 2, 3, 4: unit
5: windshield
8: display device
9: sound output device
10: HUD
40: light source unit
45: driving unit
60, 61, 62: system controller
70, 70A: main controller
72: detection unit
73: notification processing unit
74: external object detection unit
100: construction machine

What is claimed is:
1. A projection type display device comprising:
a projection display unit that projects image light, which is spatially modulated by a light modulation element that spatially modulates light emitted from a light source on the basis of image information, onto a projection surface mounted in a vehicle;

a detection unit that is capable of detecting an image light shielded state where at least a part of the image light is shielded by part of a body of an operator of the vehicle; and a control unit that performs a notification process in a case where the image light shielded state is detected by the detection unit, wherein the projection surface is a windshield of the vehicle, the projection type display device further comprises an external object detection unit that detects the position of an external object in front of the projection surface, and the control unit determines whether to perform the notification process on the basis of a range of the projection surface where the shielded part of the image light is to be projected and the position of the external object on the projection surface detected by the external object detection unit, wherein the control unit performs the notification process when the position of the external object on the projection surface is inside the range of the projection surface where the shielded part of the image light is to be projected, wherein the control unit prohibits the notification process when the position of the external object on the projection surface is outside the range of the projection surface where the shielded part of the image light is to be projected.

2. The projection type display device according to claim 1, wherein the notification process performed by the control unit is a process of notifying the presence of the image light shielded state.

3. The projection type display device according to claim 2, wherein the control unit notifies the presence of the image light shielded state by changing information corresponding to a part of the image light excluding the shielded part of the image light to information including notification information indicating the presence of the image light shielded state, in the image information.

4. The projection type display device according to claim 2, wherein the control unit performs the notification using sound.

5. The projection type display device according to claim 1, wherein the notification process performed by the control unit is a process of notifying shielding information, to be presented to the operator of the vehicle, included in information corresponding to the shielded part of the image light in the image information.

6. The projection type display device according to claim 5, wherein the control unit notifies the shielding information by including the shielding information in information corresponding to a part of the image light excluding the shielded part of the image light in the image information.

7. The projection type display device according to claim 5, wherein the control unit notifies the shielding information using sound.

8. The projection type display device according to claim 5, wherein the control unit notifies the shielding information by displaying the shielding information on a display device mounted in the vehicle.

9. The projection type display device according to claim 1, wherein the vehicle is a working machine.

10. The projection type display device according to claim 1, wherein the projection display unit is disposed at a position distant from the projection surface with reference to an operator's seat in an indoor space of the vehicle.

11. A projection control method of the projection type display device according to claim 1 for projecting image light spatially modulated by the light modulation element that spatially modulates light emitted from the light source on the basis of image information onto the projection surface mounted in a vehicle, comprising:

a detection step of detecting the image light shielded state; and a control step of performing a notification process in a case where the image light shielded state is detected in the detection step, wherein the projection surface is a windshield of the vehicle, the projection control method further comprises an external object detection step of detecting the position of an external object in front of the projection surface, and the control step includes determining whether to perform the notification process on the basis of a range of the projection surface where the shielded part of the image light is to be projected and the position of the external object on the projection surface detected in the external object detection step, wherein the control step includes performing the notification process when the position of the external object on the projection surface is detected to be inside the range of the projection surface where the shielded part of the image light is to be projected, wherein the control step includes prohibiting the notification process when the position of the external object on the projection surface is detected to be outside the range of the projection surface where the shielded part of the image light is to be projected.

12. The projection control method according to claim 11, wherein the notification process is a process of notifying the presence of the image light shielded state.

13. The projection control method according to claim 12, wherein the control step includes notifying the presence of the image light shielded state by changing information corresponding to a part of the image light excluding the shielded part of the image light to information including notification information indicating the presence of the image light shielded state, in the image information.

14. The projection control method according to claim 12, wherein the control step includes performing the notification using sound.

15. The projection control method according to claim 11, wherein the notification process is a process of notifying shielding information, for performing information presentation to the operator of the vehicle, included in information corresponding to the shielded part of the image light in the image information.

16. The projection control method according to claim 15, wherein the control step includes notifying the shielding information by including the shielding information in information corresponding to a part of the image light excluding the shielded part of the image light in the image information.

17. The projection control method according to claim 15, wherein the control step includes notifying the shielding information using sound.

18. The projection control method according to claim 15, wherein the control step includes notifying the shielding information by displaying the shielding information on a display device mounted in the vehicle.

19. The projection control method according to claim 11, wherein the vehicle is a working machine.

* * * * *